(12) United States Patent
Wu

(10) Patent No.: US 12,316,467 B2
(45) Date of Patent: May 27, 2025

(54) MEASUREMENT METHOD, TERMINAL, AND NETWORK-SIDE DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/948,191

(22) Filed: Sep. 19, 2022

(65) Prior Publication Data

US 2023/0014768 A1   Jan. 19, 2023

Related U.S. Application Data

(63) Continuation of application No. PCT/CN2021/082285, filed on Mar. 23, 2021.

(30) Foreign Application Priority Data

Mar. 24, 2020   (CN) .......................... 202010214536.9

(51) Int. Cl.
*H04L 1/20* (2006.01)
*H04L 1/1812* (2023.01)
(Continued)

(52) U.S. Cl.
CPC ............ *H04L 1/206* (2013.01); *H04L 1/1812* (2013.01); *H04L 1/1822* (2013.01); *H04W 24/10* (2013.01)

(58) Field of Classification Search
CPC ...... H04L 1/206; H04L 1/1812; H04L 1/1822; H04L 1/20; H04L 5/001; H04L 5/0037;
(Continued)

(56) References Cited

U.S. PATENT DOCUMENTS

| 2019/0230588 A1* | 7/2019 | Kim ................. H04W 36/0055 |
| 2019/0281485 A1* | 9/2019 | da Silva .............. H04B 17/345 |
| 2020/0296693 A1* | 9/2020 | Tang ..................... H04W 72/23 |

FOREIGN PATENT DOCUMENTS

| CN | 102802187 A | 11/2012 |
| CN | 103391574 A | 11/2013 |

(Continued)

OTHER PUBLICATIONS

Second Office Action issued in related Chinese Application No. 202010214536.9, mailed Jan. 4, 2023, 9 pages.
(Continued)

*Primary Examiner* — Thien Nguyen
(74) *Attorney, Agent, or Firm* — PX PLLC

(57) ABSTRACT

A measurement method, a terminal, and a network-side device are provided. The measurement method performed by a terminal includes: performing a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes; and sending a measurement report to a network-side device according to the first measurement result in a case that a measurement report triggering condition is met, where P is an integer greater than 1, and Q is a positive integer.

20 Claims, 5 Drawing Sheets

---

Perform a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes — 201

↓

Send a measurement report to a network-side device according to the first measurement result in a case that a measurement report triggering condition is met — 202

(51) Int. Cl.
*H04L 1/1822* (2023.01)
*H04W 24/10* (2009.01)

(58) Field of Classification Search
CPC .... H04L 5/0058; H04L 5/0053; H04W 24/10; H04W 24/08; H04W 24/02
See application file for complete search history.

(56) References Cited

FOREIGN PATENT DOCUMENTS

| | | | |
|---|---|---|---|
| CN | 103581991 | A | 2/2014 |
| CN | 105657837 | A | 6/2016 |
| CN | 108024278 | A | 5/2018 |
| CN | 109474951 | A | 3/2019 |
| CN | 110035450 | A | 7/2019 |
| CN | 108024278 | B | 12/2019 |
| CN | 110661600 | A | 1/2020 |
| WO | 2017173037 | A1 | 10/2017 |
| WO | 2018085374 | A1 | 5/2018 |
| WO | 2019241912 | A1 | 12/2019 |
| WO | 2020029176 | A1 | 2/2020 |

OTHER PUBLICATIONS

Third Office Action issued in related Chinese Application No. 202010214536.9, mailed Apr. 29, 2023, 9 pages.
International Search Report issued in corresponding International Application No. PCT/CN2021/082285, mailed Jun. 9, 2021, 4 pages.
Extended European Search Report issued in related European Application No. 21775143.7, mailed Jul. 24, 2023, 12 pages.
First Office Action issued in related Chinese Application No. 202010214536.9, mailed Jul. 29, 2022, 11 pages.
Nokia, Nokia Shanghai Bell, "Enhancements on Multi-TRP/Panel Transmission", 3GPP TSG RAN WG1 Meeting #95, R1-1813489, Nov. 2018, 15 pages.

\* cited by examiner

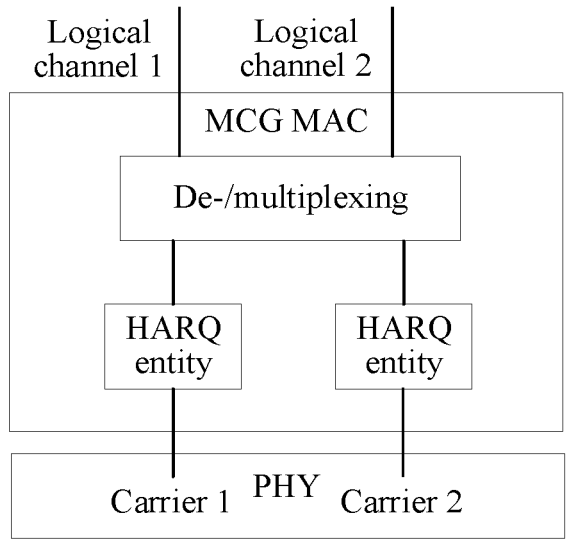

FIG. 1

Perform a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes — 201

Send a measurement report to a network-side device according to the first measurement result in a case that a measurement report triggering condition is met — 202

FIG. 2

Receive a measurement report sent by a terminal, where the measurement report is obtained by the terminal according to a first measurement result, and the first measurement result is obtained by the terminal by performing a measurement operation on a first transmission node in Q transmission nodes — 301

FIG. 3

MEASUREMENT METHOD, TERMINAL, AND NETWORK-SIDE DEVICE

CROSS-REFERENCE TO RELATED APPLICATIONS

This application is a continuation of International Application No. PCT/CN2021/082285, filed Mar. 23, 2021, which claims priority to Chinese Patent Application No. 202010214536.9, filed Mar. 24, 2020. The entire contents of each of the above-referenced applications are expressly incorporated herein by reference.

TECHNICAL FIELD

Embodiments of the present disclosure relate to the field of communications technologies, and in particular, to a measurement method, a terminal, and a network-side device.

BACKGROUND

During reporting a measurement result of a neighboring cell, a terminal also reports a measurement result of a serving cell to a network-side device.

Currently, transmission signals of one serving cell only comes from one transmission node. Therefore, during performing measurement on the serving cell, only one transmission node included in the serving cell needs to be measured, and a measurement value of a transmission frequency needs to be reported. However, in a case that the transmission signals of the one serving cell comes from a plurality of transmission nodes, there is no solution for how to perform measurement on the transmission nodes included in the serving cell.

SUMMARY

Embodiments of the present disclosure provide a measurement method, a terminal, and a network-side device.

According to a first aspect, an embodiment of the present disclosure provides a measurement method, performed by a terminal, the method includes:
 performing a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes; and
 sending a measurement report to a network-side device according to the first measurement result in a case that a measurement report triggering condition is met, where
 P is an integer greater than 1, and Q is a positive integer.

According to a second aspect, an embodiment of the present disclosure provides a measurement method, performed by a network-side device, the method includes:
 receiving a measurement report sent by a terminal, where the measurement report is obtained by the terminal according to a first measurement result, and the first measurement result is obtained by the terminal by performing a measurement operation on a first transmission node in Q transmission nodes, where
 a serving frequency of the terminal includes P transmission nodes; the Q transmission nodes are Q transmission nodes that allow measurement in the P transmission nodes; and P is an integer greater than 1, and Q is a positive integer.

According to a third aspect, an embodiment of the present disclosure further provides a terminal, including:
 a measurement module, configured to perform a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes; and
 a first sending module, configured to send a measurement report to a network-side device according to the first measurement result in a case that a measurement report triggering condition is met, where:
 P is an integer greater than 1, and Q is a positive integer.

According to a fourth aspect, an embodiment of the present disclosure further provides a network-side device, including:
 a second receiving module, configured to receive a measurement report sent by a terminal, where the measurement report is obtained by the terminal according to a first measurement result, and the first measurement result is obtained by the terminal by performing a measurement operation on a first transmission node in Q transmission nodes, where
 a serving frequency of the terminal includes P transmission nodes; the Q transmission nodes are Q transmission nodes that allow measurement in the P transmission nodes; and P is an integer greater than 1, and Q is a positive integer.

According to a fifth aspect, an embodiment of the present disclosure further provides a terminal, including a processor, a memory, and a computer program stored on the memory and executable by the processor, where the computer program, when executed by the processor, implements the steps of the measurement method described above.

According to a sixth aspect, an embodiment of the present disclosure further provides a network-side device, including a processor, a memory, and a computer program stored on the memory and executable by the processor, where the computer program, when executed by the processor, implements the steps of the measurement method described above.

According to a seventh aspect, an embodiment of the present disclosure further provides a computer-readable storage medium, storing a computer program, where the computer program, when executed by a processor, implements the steps of the measurement method performed by a terminal, or the steps of the measurement method performed by a network-side device described above.

According to an eighth aspect, an embodiment of the present disclosure further provides a computer software product, stored in a non-volatile storage medium, where the software product is configured to be executed by at least one processor, to implement the steps of the measurement method performed by a terminal, or the steps of the measurement method performed by a network-side device described above.

According to a ninth aspect, an embodiment of the present disclosure further provides a terminal, configured to perform the measurement method performed by a terminal described above.

According to a tenth aspect, an embodiment of the present disclosure further provides a network-side device, configured to perform the measurement method performed by a network-side device described above.

In the embodiments of the present disclosure, in a case that a serving frequency of the terminal includes P transmission nodes, the terminal performs a measurement operation on a first transmission node in Q transmission nodes that allow measurement in the P transmission nodes, to obtain a first measurement result, where the Q transmission nodes are Q transmission nodes that allow measurement in the P transmission nodes; and sends a measurement report to a network-side device according to the first measurement result in a case that a measurement report triggering condition is met, where P is an integer greater than 1, and Q is a positive integer. It can be seen that the embodiments of the present disclosure provide a solution for the measurement on a transmission node side included in the serving frequency, so that the management of the serving frequency can be facilitated.

BRIEF DESCRIPTION OF THE DRAWINGS

To describe the technical solutions of the embodiments of the present disclosure more clearly, the following briefly introduces the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

FIG. 1 is a schematic diagram of carrier aggregation according to an embodiment of the present disclosure;

FIG. 2 a first flowchart of a measurement method according to an embodiment of the present disclosure;

FIG. 3 is a second flowchart of a measurement method according to an embodiment of the present disclosure;

DETAILED DESCRIPTION

Figure 4:
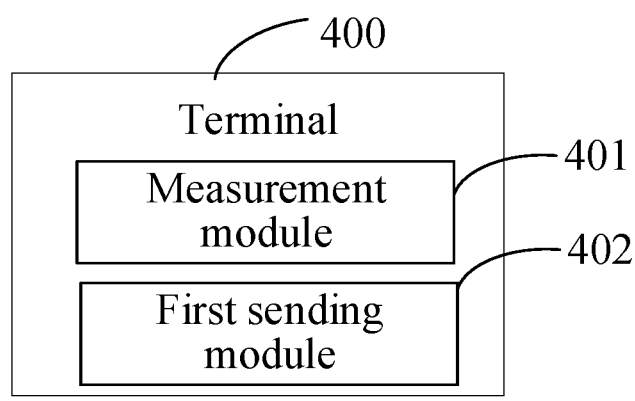
FIG. 4 is a first structural diagram of a terminal according to an embodiment of the present disclosure.

The technical solutions in embodiments of the present disclosure are described clearly below with reference to the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, the terms "first", "second", and so on are intended to distinguish between similar objects but do not indicate a particular order or sequence. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device. In addition, the use of "and/or" in this application means at least one of the connected objects, for example, 7 conditions such as A and/or B and/or C, indicating including A alone, B alone, C alone, and both A and B present, B and C present, A and C present, and A, B, and C all present.

For the convenience of understanding, some contents involved in the embodiments of the present disclosure are described below:

1. Carrier Aggregation (CA).

A User Equipment (UE) may be configured to work under a plurality of Component Carrier (CC) with different frequencies, that is, different Absolute Radio Frequency Channel Number (ARFCN) at the same time.

The CA includes one Primary Cell (PCell) and at least one Secondary Cell (SCell).

Each carrier is a specific serving cell, and is configured with a corresponding serving cell identifier. The configuration of one serving cell includes a common cell configuration applicable to all UEs in the cell and a dedicated cell configuration applicable to a specific UE.

As shown in FIG. 1, each carrier corresponds to one Hybrid Automatic Repeat Request (HARQ) entity, and the HARQ entity includes a plurality of HARQ processes. In FIG. 1, there are a Master Cell Group (MCG); a Media Access Control (MAC); a Logical Channel (LCH); a Physical Layer (PHY); and de-/multiplexing.

2. Bandwidth Part (BWP)

For a specific cell, a maximum of 4 BWPs can be configured on a network side, corresponding to different operating frequency ranges. The network side may indicate an activated BWP through Downlink Control Information (DCI). For a specific cell, a UE can only have one activated BWP at the same time.

3. Dual Connectivity (DC).

A UE may establish a connection in two cell groups, that is, a Master Cell Group (MCG) and a Secondary Cell Group (SCG) at the same time. The MCG includes a PCell and a SCell, and the SCG includes a Primary Secondary Cell (PSCell) and a SCell. Both the PCell and the PSCell may also be referred to as Special Cell (SpCell).

4. Serving Cell Measurement.

In the fifth generation (5G) mobile communication system, because different cells have different types of reference signals, such as a Synchronous Signal Block (SSB) or a Channel State Information-Reference Signal (CSI-RS), to enable a UE to perform a measurement in a serving cell, a network configures a specific serving cell measurement object (for example, Serving Cell MO) for a specific serving cell (such as a PCell or a PSCell), and then the UE performs, according to the specific serving cell measurement object, the measurement for the specific serving cell configured with the serving cell measurement object, where the configuration of the measurement object includes at least one of the following:

a measurement frequency, such as an Absolute Radio Frequency Channel Number (ARFCN-1);

a measurement Subcarrier Spacing (SCS), such as 15 kilohertz (KHz);

a type of a measurement reference signal, such as an SSB or a CSI-RS;

a time domain of the measurement reference signal, such as SSB Measurement Timing Configuration (SMTC);

a frequency domain of the measurement reference signal, such as a measurement frequency of an SSB signal (SSB Frequency), or a measurement frequency position of a CSI-RS signal; or a measurement result correction parameter, which means that the UE adds or subtracts a corresponding correction parameter, such as an offset MO, to or from a measurement result.

During reporting a measurement result of a neighboring cell, the UE also reports a measurement result of a serving cell to a network side.

A measurement method in an embodiment of the present disclosure is described below.

In this embodiment of the present disclosure, a serving frequency may be: a serving cell or a BWP. A serving transmission node of a terminal may be understood as: a transmission node serving the terminal (Transmission Reception Point, TRP); and the serving transmission node may be: an activated transmission node or a working transmission node.

FIG. 2 is a first flowchart of a measurement method according to an embodiment of the present disclosure. The measurement method shown in FIG. 2 is performed by a terminal. The terminal may also be referred to as user equipment (UE). In actual applications, the terminal may be a mobile phone, a tablet computer, a laptop computer, a personal digital assistant, a mobile Internet device, a wearable device, an in-vehicle device, or the like.

As shown in FIG. 2, the measurement method performed by a terminal may include the following steps:

Step 201: Perform a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes; and P is an integer greater than 1, and Q is a positive integer.

Figure 8:
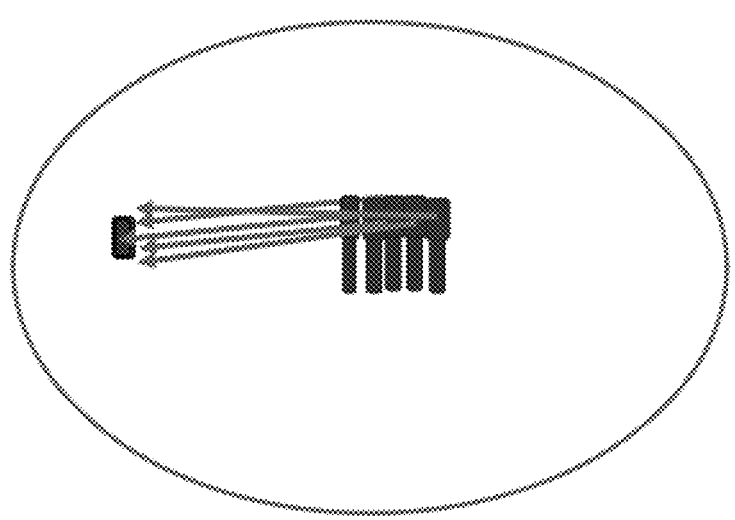
FIG. 8 is an illustration of a multi-node transmission scenario for a terminal.

In this embodiment, a serving frequency of the terminal includes P transmission nodes (as shown in FIG. 8), and P is an integer greater than 1.

In some embodiments, physical identifiers of the P transmission nodes are different. That is, the P transmission nodes may be distinguished by P different transmission node identifiers.

In some embodiments, the physical identifier may include at least one of the following:

a Physical Cell Identifier (PCI);
an identifier of a reference signal;
a port number identifier corresponding to the reference signal; or
a resource position identifier of a control channel.

The identifier of the reference signal may be: an identifier of a reference signal of a transmission node, or an identifier of a reference signal of a control channel of a transmission node; and The port number identifier corresponding to the reference signal may be: a port number identifier corresponding to the reference signal of the transmission node, or a port number identifier corresponding to the reference signal of the control channel of the transmission node, but is not limited thereto.

In actual applications, the reference signal may be any one of the following: a Synchronous Signal Block (SSB), or a Channel State Information Reference Signal (CSI-RS).

The control channel may be a downlink control channel, such as a Physical Downlink Control Channel (PDCCH). The resource position may be any one of the following: a Control Resource Set (CORESET), or a search space.

In this embodiment, the terminal may perform the measurement on some or all of the P transmission nodes. In a specific implementation, the terminal may first determine Q transmission nodes that allow measurement in P transmission nodes, then determine a first transmission node, that is, a target transmission frequency for the measurement, in the Q measurement nodes, and then perform a measurement operation on each transmission node in the first transmission node.

The determination of the Q transmission nodes that allow measurement in the P transmission nodes is described below.

The Q transmission nodes may include some or all of the P transmission nodes. In some embodiments, the Q transmission nodes may be agreed in a protocol or configured by a network-side device.

In a case that the Q transmission nodes are configured by a network-side device, before the performing a measurement operation on a first transmission node in Q transmission nodes, to obtain a first measurement result, the method further includes: receiving configuration information sent by the network-side device, where the configuration information is used for performing measurement configuration on the Q transmission nodes.

In some embodiments, the configuration information includes at least one of the following of the Q transmission nodes:

a physical identifier of the transmission nodes;
a measurement subcarrier spacing corresponding to the transmission nodes;
a type of a measurement reference signal corresponding to the transmission nodes;
a resource position of the measurement reference signal corresponding to the transmission nodes;
a measurement result correction parameter corresponding to the transmission nodes; or
a measurement type corresponding to the transmission nodes.

In actual applications, the resource position of the measurement reference signal may include at least one of a time domain position or a frequency domain position of the measurement reference signal. The measurement type corresponding to the transmission node may be any of the following: a Reference Signal Received Power (RSRP), a Reference Signal Received Quality (RSRQ), a Received Signal Strength Indicator (RSSI)), or a Channel Occupancy Rate COR).

The first transmission node in the Q transmission nodes is described below.

The first transmission node may include some or all of the Q transmission nodes.

In some embodiments, the first transmission node in the Q transmission nodes is any one of the following:

all transmission nodes in the Q transmission nodes;
a serving transmission node of the terminal in the Q transmission nodes; or
a specified transmission node in the Q transmission nodes.

In some embodiments, a specified transmission node in the Q transmission nodes may include at least one of the following: a primary transmission node in the Q transmission nodes; a default transmission node in the Q transmission nodes; or an initial transmission node in the Q transmission nodes.

For the convenience of understanding the determination of the first transmission node, an example is described as follows:

It is assumed that a PCell of the terminal includes 4 transmission nodes, including a PCI-1, a PCI-2, a PCI-3, and a PCI-4, and the network-side device has performed measurement configuration on the PCI-1, the PCI-2, the PCI-3, and the PCI-4; the PCI-1 and the PCI-2 are activated transmission nodes; and the PCI-1 is a primary transmission node.

Then, in a case that the first transmission node is all of the Q transmission nodes, the terminal may perform the measurement on the PCI-1, the PCI-2, the PCI-3, and the PCI-4.

In a case that the first transmission node is a serving transmission node of the terminal in the Q transmission nodes, the terminal may perform the measurement on the PCI-1 and the PCI-2, but not perform the measurement on the PCI-3 and the PCI-4.

In a case that the first transmission node is a primary transmission node in the Q transmission nodes, the terminal may perform the measurement on the PCI-1, but not perform the measurement on the PCI-2, the PCI-3, and the PCI-4.

In actual applications, the first transmission node may be predetermined by a protocol or configured by a network-side device.

Step 202: Send a measurement report to a network-side device according to the first measurement result in a case that a measurement report triggering condition is met.

In this embodiment, the measurement report sent by the terminal is determined based on the first measurement result. During a specific implementation, in an implementation, the measurement report may include the first measurement result; and in another implementation, the content included in the measurement report may be obtained by processing the first measurement result.

In the measurement method in this embodiment, in a case that a serving frequency of the terminal includes P transmission nodes, the terminal performs a measurement operation on a first transmission node in Q transmission nodes that allow measurement in the P transmission nodes, to obtain a first measurement result, where the Q transmission nodes are Q transmission nodes that allow measurement in the P transmission nodes; and sends a measurement report to a network-side device according to the first measurement result in a case that a measurement report triggering condition is met, where P is an integer greater than 1, and Q is a positive integer. It can be seen that the embodiments of the present disclosure provide a solution for the measurement on the transmission node side included in the serving frequency, and standardize the measurement of the transmission node of the serving frequency, so that the measurement accuracy of the transmission node of the serving frequency of the terminal can be improved, and the management of the serving frequency can be facilitated. In addition, the terminal can be prevented from performing the measurement on transmission nodes other than the first transmission node, so that the power consumption and the operation load of the terminal can be reduced.

In this embodiment, the first measurement result may include at least one of the following:
  measurement results of all transmission nodes on which the measurement operation has been performed; or
  a measurement result of the serving frequency.

In some embodiments, the measurement result of the serving frequency is obtained by the terminal through calculation according to a measurement result of a third transmission node on which the measurement operation has been performed. Further, the measurement result of the serving frequency may be obtained by the terminal by averaging measurement results of each of the transmission nodes in the third transmission node, but is not limited thereto.

The third transmission node may be all or some of the transmission nodes on which the measurement operation has been performed. In actual applications, the third transmission node may be predetermined by a protocol or configured by a network-side device.

In some embodiments, the third transmission node may be any one of the following:
  all transmission nodes on which the measurement operation has been performed;
  a transmission node on which the measurement operation has been performed and that corresponds to a measurement result greater than or equal to a threshold value; or
  N consecutive transmission nodes on which the measurement operation has been performed in a case that the transmission nodes are sorted according to the measurement result, where N is a positive integer.

In some embodiments, the threshold value may be agreed in a protocol or configured by a network-side device. The N transmission nodes may be: the first N transmission nodes or the last N transmission nodes on which the measurement operation has been performed in a case that the transmission nodes are sorted according to measurement results in descending order. It should be understood that a value of N is less than or equal to a quantity of transmission nodes included in the third transmission node.

In actual applications, the measurement result may be expressed as an RSRP or an RSRQ, but is not limited thereto. For the convenience of understanding, the measurement result of the transmission node is represented by an RSRP of the transmission node below.

Exemplarily: it is assumed that the terminal performs the measurement on a PCI-1, a PCI-2, a PCI-3, and a PCI-4. an RSRP4 of the PCI-4>an RSRP1 of the PCI-1>a threshold value>an RSRP2 of the PCI-2>an RSRP3 of the PCI-3.

Then, in a case that the third transmission node is all transmission nodes on which the measurement operation has been performed, an RSRP of the serving frequency= (RSRP1+RSRP2+RSRP3+RSRP4)/4.

In a case that the third transmission node is a transmission node on which the measurement operation has been performed and the measurement result is greater than or equal to the threshold value, the RSRP of the serving frequency= (RSRP1+RSRP4)/2.

In a case that the third transmission node is the first three transmission nodes on which the measurement operation has been performed in a case that the transmission nodes are sorted according to the measurement results in descending order, the RSRP of the serving frequency=(RSRP1+ RSRP2+RSRP4)/3.

In a case that the third transmission node is the last three transmission nodes on which the measurement operation has been performed in a case that the transmission nodes are sorted according to the measurement results in the descending order, the RSRP of the serving frequency=(RSRP1+ RSRP2+RSRP3)/3.

In this embodiment, the measurement report includes at least one of the following:
  a measurement result of a second transmission node on which the measurement operation has been performed; or
  a measurement result of the serving frequency.

For the measurement result of the serving frequency, reference may be made to the foregoing description, and details are not described herein again.

The second transmission node is all or some of the transmission nodes on which the measurement operation has been performed. In actual applications, the second transmission node may be predetermined by a protocol or configured by a network-side device.

In some embodiments, the second transmission node is any one of the following:
   all transmission nodes on which the measurement operation has been performed;
   a specified transmission node in the transmission nodes on which the measurement operation has been performed;
   a serving transmission node of the terminal in the transmission nodes on which the measurement operation has been performed; or
   K consecutive transmission nodes in the transmission nodes on which the measurement operation has been performed in a case that the transmission nodes are sorted according to the measurement result, where K is a positive integer.

In some embodiments, the specified transmission node in the transmission nodes on which the measurement operation has been performed may include at least one of the following: a primary transmission node of the transmission nodes on which the measurement operation has been performed; a default transmission node in the transmission nodes on which the measurement operation has been performed; or an initial transmission node in the transmission nodes on which the measurement operation has been performed.

In some embodiments, the K transmission nodes may be: the first K transmission nodes or the last K transmission nodes in the transmission nodes on which the measurement operation has been performed in a case that the transmission nodes are sorted according to the measurement results in the descending order. It should be understood that a value of K is less than or equal to a quantity of the transmission nodes on which the measurement operation has been performed.

Exemplarily: it is assumed that the terminal performs the measurement on a PCI-1, a PCI-2, a PCI-3, and a PCI-4. an RSRP4 of the PCI-4>an RSRP1 of the PCI-1>a threshold value>an RSRP2 of the PCI-2>an RSRP3 of the PCI-3; the PCI-2 is the initial transmission node; and the working transmission nodes include the PCI-3 and the PCI-4.

Then, in a case that the second transmission node is all transmission nodes on which the measurement operation has been performed, the measurement result of the second transmission node includes: the RSRP1 of the PCI-1, the RSRP2 of the PCI-2, the RSRP3 of the PCI-3, and the RSRP4 of the PCI-4.

In a case that the second transmission node is an initial transmission node in the transmission nodes on which the measurement operation has been performed, the measurement result of the second transmission node only includes the RSRP2 of the PCI-2, and does not include the RSRP1 of the PCI-1, the RSRP3 of the PCI-3, and the RSRP4 of the PCI-4.

In a case that the second transmission node is a serving transmission node of the terminal in the transmission nodes on which the measurement operation has been performed, the measurement result of the second transmission node only includes the RSRP3 of the PCI-3 and the RSRP4 of the PCI-4, and does not include the RSRP1 of the PCI-1 and the RSRP2 of the PCI-2.

In a case that the second transmission node is the last two transmission nodes in the transmission nodes on which the measurement operation has been performed in a case that the transmission nodes are sorted according to measurement results in descending order, the measurement result of the second transmission node only includes the RSRP3 of the PCI-3 and the RSRP2 of the PCI-2, and does not include the RSRP1 of the PCI-1 and the RSRP4 of the PCI-4.

In addition, in some embodiments, the measurement report may further include physical identifiers of one or more transmission nodes. In some embodiments, the physical identifier included in the measurement report may be a physical identifier of a transmission node on which the measurement operation has been performed, a physical identifier of the second transmission node, or a physical identifier of the third transmission node.

FIG. 3 is a second flowchart of a measurement method according to an embodiment of the present disclosure. The measurement method shown in FIG. 3 is performed by a network-side device. In actual applications, the network-side device 12 may be a base station, a relay, an access point, or the like.

As shown in FIG. 3, the measurement method performed by a network-side device may include the following steps:
   Step 301: Receive a measurement report sent by a terminal, where the measurement report is obtained by the terminal according to a first measurement result, and the first measurement result is obtained by the terminal by performing a measurement operation on a first transmission node in Q transmission nodes, where
   a serving frequency of the terminal includes P transmission nodes; the Q transmission nodes are Q transmission nodes that allow measurement in the P transmission nodes; and P is an integer greater than 1, and Q is a positive integer.

In the measurement method in this embodiment, the network-side device receives a measurement report sent by a terminal, where the measurement report is obtained by the terminal according to a first measurement result, and the first measurement result is obtained by the terminal by performing a measurement operation on a first transmission node in Q transmission nodes, where a serving frequency of the terminal includes P transmission nodes; the Q transmission nodes are Q transmission nodes that allow measurement in the P transmission nodes; and P is an integer greater than 1, and Q is a positive integer. In this way, by standardizing the measurement of transmission nodes of a serving frequency of a terminal, a network-side device can accurately obtain a measurement report of the serving frequency of the terminal, thereby facilitating the management of the transmission nodes of the serving frequency of the terminal by the network-side device.

In some embodiments, before the receiving a measurement report sent by a terminal, the method further includes:
   sending first indication information to the terminal, where the first indication information is used for indicating the first transmission node.

In some embodiments, the first transmission node in the Q transmission nodes is any one of the following:
   all transmission nodes in the Q transmission nodes;
   a serving transmission node of the terminal in the Q transmission nodes; or
   a specified transmission node in the Q transmission nodes.

In some embodiments, the first measurement result includes at least one of the following:
   measurement results of all transmission nodes on which the measurement operation has been performed; or
   a measurement result of the serving frequency.

In some embodiments, the measurement report includes at least one of the following:
   a measurement result of a second transmission node on which the measurement operation has been performed; or a measurement result of the serving frequency.

In some embodiments, before the receiving a measurement report sent by a terminal, the method further includes:
sending second indication information to the terminal, where the second indication information is used for indicating the second transmission node.

In some embodiments, the second transmission node is any one of the following:
all transmission nodes on which the measurement operation has been performed;
a specified transmission node in the transmission nodes on which the measurement operation has been performed;
a serving transmission node of the terminal in the transmission nodes on which the measurement operation has been performed; or
K consecutive transmission nodes in the transmission nodes on which the measurement operation has been performed in a case that the transmission nodes are sorted according to the measurement result, where K is a positive integer.

In some embodiments, the measurement result of the serving frequency is obtained by the terminal through calculation according to a measurement result of a third transmission node on which the measurement operation has been performed.

In some embodiments, before the receiving a measurement report sent by a terminal, the method further includes:
sending third indication information to the terminal, where the third indication information is used for indicating the third transmission node.

In some embodiments, the third transmission node is any one of the following:
all transmission nodes on which the measurement operation has been performed;
a transmission node on which the measurement operation has been performed and that corresponds to a measurement result greater than or equal to a threshold value; or
N consecutive transmission nodes on which the measurement operation has been performed in a case that the transmission nodes are sorted according to the measurement result, where N is a positive integer.

In some embodiments, before the receiving a measurement report sent by a terminal, the method further includes:
sending configuration information to the terminal, where the configuration information is used for performing measurement configuration on the Q transmission nodes.

In some embodiments, the configuration information includes at least one of the following of the Q transmission nodes:
a physical identifier of the transmission nodes;
a measurement subcarrier spacing corresponding to the transmission nodes;
a type of a measurement reference signal corresponding to the transmission nodes;
a resource position of the measurement reference signal corresponding to the transmission nodes;
a measurement result correction parameter corresponding to the transmission nodes; or
a measurement type corresponding to the transmission nodes.

In some embodiments, physical identifiers of the P transmission nodes are different.

In some embodiments, the physical identifier may include at least one of the following:
a physical cell identifier;
an identifier of a reference signal;
a port number identifier corresponding to the reference signal; or
a resource position identifier of a control channel.

It should be noted that, this embodiment is an implementation of the network-side device corresponding to the foregoing method embodiment. Therefore, reference may be made to the related description in the foregoing method embodiment, and the same beneficial effects can be achieved. To avoid repeated descriptions, details are not described herein again.

Various optional implementations described in the embodiments of the present disclosure may be implemented in combination with each other, or may be implemented independently, which are not limited in the embodiments of the present disclosure.

For the convenience of understanding, an example is described below:

Step 1: A network side configures a terminal with a plurality of TRP information corresponding to one serving cell (or a BWP), and a plurality of transmission nodes are distinguished by a plurality of different transmission node physical identifiers, such as PCI. For example, a working frequency of a Serving Cell-1 (or a BWP-1) is f1, and the network side configures the terminal with the serving cell-1 (or the BWP-1), including a plurality of transmission nodes, such as a PCI-1, a PCI-2, a PCI-3, and a PCI-4.

The "transmission node physical identifier" may include any combination of one or more of the following:
a physical cell identifier, such as the PCI-1;
an identifier of a reference signal, such as an SSB-1 and/or a CSI-RS-1;
a port number identifier corresponding to the reference signal, such as a port_1;
a resource position identifier of a control channel, such as a CORESET identifier of a PDCCH, and/or a search space identifier;
an identifier of a reference signal of the control channel, such as an SSB identifier and/or a CSI-RS identifier; or
a port number identifier corresponding to the reference signal of the control channel, such as the port_1.

In addition, the network side configures a serving cell measurement configuration for a specific serving cell (for example, a PCell or a BWP) of a UE, and the measurement configuration additionally includes a measurement configuration corresponding to one or more transmission nodes. The "measurement configuration corresponding to the transmission nodes" includes any combination of one or more of the following:
a physical identifier of the transmission nodes;
a measurement subcarrier spacing corresponding to the transmission nodes;
a type of a measurement reference signal corresponding to the transmission nodes;
a time domain and/or a frequency domain position of the measurement reference signal corresponding to the transmission nodes;
a measurement result correction parameter corresponding to the transmission nodes; or
a measurement type corresponding to the transmission nodes, such as an RSRP, an RSRQ, an RSSI, or a COR.

Step 2: A UE performs, according to the configuration information in Step 1, measurement on a specific serving cell (or a BWP), and calculates a measurement result.

The method for performing the measurement on the transmission nodes of the specific serving cell (or the BWP) includes any of the following:

performing the measurement on all transmission nodes for a transmission node configured with the measurement, where, for example, in a case that a PCell is configured with a total of 4 transmission nodes, including a PCI-1, a PCI-2, a PCI-3, and a PCI-4, the UE then performs the measurement on the PCI-1, the PCI-2, the PCI-3, and the PCI-4;

performing the measurement on all activated (or working) transmission nodes for the transmission node configured with the measurement, where, for example, the PCell is configured with a total of 4 transmission nodes, including the PCI-1, the PCI-2, the PCI-3, and the PCI-4, and the PCI-1 and the PCI-2 are activated (or working) transmission nodes, the UE then performs the measurement on the PCI-1 and the PCI-2; and performing the measurement on a measurement result of a specified transmission node for the transmission node configured with the measurement, where, for example, the PCell is configured with a total of 4 transmission nodes, including the PCI-1, the PCI-2, the PCI-3, and the PCI-4, and the PCI-1 is a primary (or a default, or an initial) transmission node, the UE then performs the measurement on the PCI-1 configured by a network side or agreed in a protocol; where a statistics for calculating the measurement result of the specific serving cell (or the BWP) includes at least one of the following:

a measurement result of each measured transmission node, such as an RSRP of the PCI-1 and an RSRP of the PCI-2; or a measurement result of the specific serving cell, such as an RSRP of a serving cell 1.

The "measurement result of the specific serving cell (or the BWP)" is calculated according to measurement results of a plurality of transmission nodes, and a calculation method includes any one of the following:

averaging transmission node measurement results, such as a serving cell 1 (RSRP)=(PCI-1 (RSRP)+PCI-2 (RSRP))/2);

averaging measurement results of transmission nodes that exceed or equal to a threshold value, which may be configured by the network side or agreed in the protocol, where, in a case that the UE obtains measurement results of 4 transmission nodes by measurement, including a PCI-1 (RSRP), a PCI-2 (RSRP), a PCI-3 (RSRP), and a PCI-4 (RSRP), and measurement results that exceed or equal to a threshold value ssb-RSRP are the PCI-1 (RSRP) and the PCI-2 (RSRP), then the serving cell 1 (RSRP)=(PCI-1 (RSRP)+PCI-2 (RSRP))/2;

averaging measurement results of n transmission nodes with the best measurement results as the measurement result of the serving cell, where n is configured by the network side or agreed in a protocol, and a value of n may be 1, for example, the UE obtains measurement results of 4 transmission nodes, including the PCI-1 (RSRP), the PCI-2 (RSRP), the PCI-3 (RSRP), and the PCI-4 (RSRP) by measurement, n=2, the PCI-1 (RSRP) and the PCI-2 (RSRP) are the highest two, then the serving cell 1 (RSRP)=(PCI-1 (RSRP)+PCI-2 (RSRP))/2); or averaging measurement results of n transmission nodes with the worst measurement results as the measurement result of the serving cell, where n is configured by the network side or agreed in a protocol, and a value of n may be 1, for example, the UE obtains measurement results of 4 transmission nodes, including the PCI-1 (RSRP), the PCI-2 (RSRP), the PCI-3 (RSRP), and the PCI-4 (RSRP) by measurement, n=2, the PCI-1 (RSRP) and the PCI-2 (RSRP) are the lowest two, then the serving cell 1 (RSRP)=(PCI-1 (RSRP)+PCI-2 (RSRP))/2).

Step 3: The UE reports, according to the measurement in Step 2, the measurement result of the serving cell (or the BWP) in a case that a measurement report triggering condition is met. The measurement result includes at least one of the following:

a measurement result of the serving cell (or the BWP); or
measurement results of one or more transmission nodes.

In addition, the reported measurement result of the specific serving cell (or the BWP) further includes one or more "transmission node physical identifiers".

The reported "transmission node measurement result" may be further defined as:

measurement results of all transmission nodes;

a measurement result of a specified transmission node, for example, a measurement result of a transmission node (for example, a primary (or a default, or an initial)) configured by the network side or agreed in the protocol;

a measurement result of an activated (or working) transmission node;

measurement results of n transmission nodes with the best signal quality, where a value of n may be 1; or measurement results of n transmission nodes with the worst signal quality, where the value of n may be 1.

In this embodiment of the present disclosure, a plurality of transmission node measurement configurations are configured for one serving cell; a plurality of transmission nodes are measured; the measurement result of the serving cell is calculated according to measurement results of the plurality of transmission nodes; and the measurement results of the transmission nodes and the measurement result of the serving cell are reported to the network side. Through this embodiment of the present disclosure, in a case that a quality of transmission signals of one serving cell (or a BWP) comes from a plurality of transmission nodes, through more reasonable measurement of transmission nodes included in the serving cell (or the BWP), the management between accurate measurement and power saving can be more reasonable.

FIG. 4 is a first structural diagram of a terminal according to an embodiment of the present disclosure. As shown in FIG. 4, the terminal 400 includes:

a measurement module 401, configured to perform a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes; and a first sending module 402, configured to send a measurement report to a network-side device according to the first measurement result in a case that a measurement report triggering condition is met, where P is an integer greater than 1, and Q is a positive integer.

In some embodiments, the first transmission node in the Q transmission nodes is any one of the following:

all transmission nodes in the Q transmission nodes;
a serving transmission node of the terminal in the Q transmission nodes; or
a specified transmission node in the Q transmission nodes.

In some embodiments, the first measurement result includes at least one of the following:
    measurement results of all transmission nodes on which the measurement operation has been performed; or
    a measurement result of the serving frequency.

In some embodiments, the measurement report includes at least one of the following:
    a measurement result of a second transmission node on which the measurement operation has been performed; or
    a measurement result of the serving frequency.

In some embodiments, the second transmission node is any one of the following:
    all transmission nodes on which the measurement operation has been performed;
    a specified transmission node in the transmission nodes on which the measurement operation has been performed;
    a serving transmission node of the terminal in the transmission nodes on which the measurement operation has been performed; or
    K consecutive transmission nodes in the transmission nodes on which the measurement operation has been performed in a case that the transmission nodes are sorted according to the measurement result, where K is a positive integer.

In some embodiments, the measurement result of the serving frequency is obtained by the terminal through calculation according to a measurement result of a third transmission node on which the measurement operation has been performed.

In some embodiments, the third transmission node is any one of the following:
    all transmission nodes on which the measurement operation has been performed;
    a transmission node on which the measurement operation has been performed and that corresponds to a measurement result greater than or equal to a threshold value; or
    N consecutive transmission nodes on which the measurement operation has been performed in a case that the transmission nodes are sorted according to the measurement result, where N is a positive integer.

In some embodiments, the terminal 400 further includes:
    a first receiving module, configured to receive configuration information sent by the network-side device, where the configuration information is used for performing measurement configuration on the Q transmission nodes.

In some embodiments, the configuration information includes at least one of the following of the Q transmission nodes:
    a physical identifier of the transmission nodes;
    a measurement subcarrier spacing corresponding to the transmission nodes;
    a type of a measurement reference signal corresponding to the transmission nodes;
    a resource position of the measurement reference signal corresponding to the transmission nodes;
    a measurement result correction parameter corresponding to the transmission nodes; or
    a measurement type corresponding to the transmission nodes.

In some embodiments, physical identifiers of the P transmission nodes are different.

In some embodiments, the physical identifier may include at least one of the following:
    a physical cell identifier;
    an identifier of a reference signal;
    a port number identifier corresponding to the reference signal; or
    a resource position identifier of a control channel.

The terminal 400 can implement the processes implemented by the terminal in method embodiments of the present disclosure, and achieve the same beneficial effects. To avoid repetition, details are not described herein again.

Figure 5:
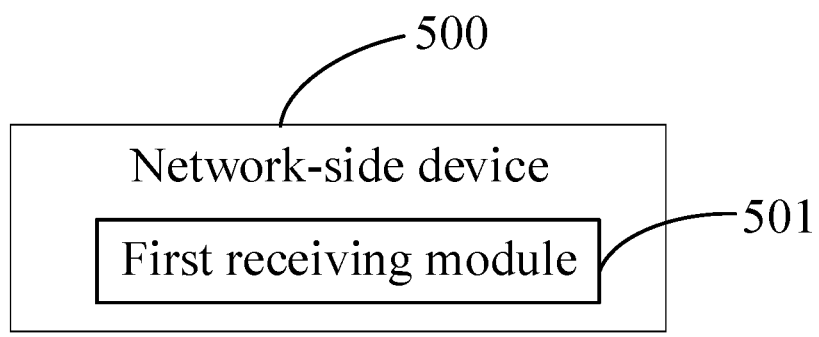
FIG. 5 is a first structural diagram of a network-side device according to an embodiment of the present disclosure.

FIG. 5 is a first structural diagram of a network-side device according to an embodiment of the present disclosure. As shown in FIG. 5, the network-side device 500 includes:
    a second receiving module 501, configured to receive a measurement report sent by a terminal, where the measurement report is obtained by the terminal according to a first measurement result, and the first measurement result is obtained by the terminal by performing a measurement operation on a first transmission node in Q transmission nodes, where
    a serving frequency of the terminal includes P transmission nodes; the Q transmission nodes are Q transmission nodes that allow measurement in the P transmission nodes; and P is an integer greater than 1, and Q is a positive integer.

In some embodiments, the network-side device 500 further includes:
    a second sending module, configured to send first indication information to the terminal, where the first indication information is used for indicating the first transmission node.

In some embodiments, the first transmission node in the Q transmission nodes is any one of the following:
    all transmission nodes in the Q transmission nodes;
    a serving transmission node of the terminal in the Q transmission nodes; or
    a specified transmission node in the Q transmission nodes.

In some embodiments, the first measurement result includes at least one of the following:
    measurement results of all transmission nodes on which the measurement operation has been performed; or
    a measurement result of the serving frequency.

In some embodiments, the measurement report includes at least one of the following:
    a measurement result of a second transmission node on which the measurement operation has been performed; or
    a measurement result of the serving frequency.

In some embodiments, the network-side device 500 further includes:
    a third sending module, configured to send second indication information to the terminal, where the second indication information is used for indicating the second transmission node.

In some embodiments, the second transmission node is any one of the following:
    all transmission nodes on which the measurement operation has been performed;
    a specified transmission node in the transmission nodes on which the measurement operation has been performed;
    a serving transmission node of the terminal in the transmission nodes on which the measurement operation has been performed; or
    K consecutive transmission nodes in the transmission nodes on which the measurement operation has been performed in a case that the transmission nodes are sorted according to the measurement result, where K is a positive integer.

In some embodiments, the measurement result of the serving frequency is obtained by the terminal through calculation according to a measurement result of a third transmission node on which the measurement operation has been performed.

In some embodiments, the network-side device 500 further includes:

a fourth sending module, configured to send third indication information to the terminal, where the third indication information is used for indicating the third transmission node.

In some embodiments, the third transmission node is any one of the following:

all transmission nodes on which the measurement operation has been performed;

a transmission node on which the measurement operation has been performed and that corresponds to a measurement result greater than or equal to a threshold value; or N consecutive transmission nodes on which the measurement operation has been performed in a case that the transmission nodes are sorted according to the measurement result, where N is a positive integer.

In some embodiments, the network-side device 500 further includes:

a fifth sending module, configured to send configuration information to the terminal, where the configuration information is used for performing measurement configuration on the Q transmission nodes.

In some embodiments, the configuration information includes at least one of the following of the Q transmission nodes:

a physical identifier of the transmission nodes;

a measurement subcarrier spacing corresponding to the transmission nodes;

a type of a measurement reference signal corresponding to the transmission nodes;

a resource position of the measurement reference signal corresponding to the transmission nodes;

a measurement result correction parameter corresponding to the transmission nodes; or a measurement type corresponding to the transmission nodes.

In some embodiments, physical identifiers of the P transmission nodes are different.

In some embodiments, the physical identifier may include at least one of the following:

a physical cell identifier;

an identifier of a reference signal;

a port number identifier corresponding to the reference signal; or a resource position identifier of a control channel.

The network-side device 500 can implement the processes implemented by the network-side device in method embodiments of the present disclosure, and achieve the same beneficial effects. To avoid repetition, details are not described herein again.

Figure 6:
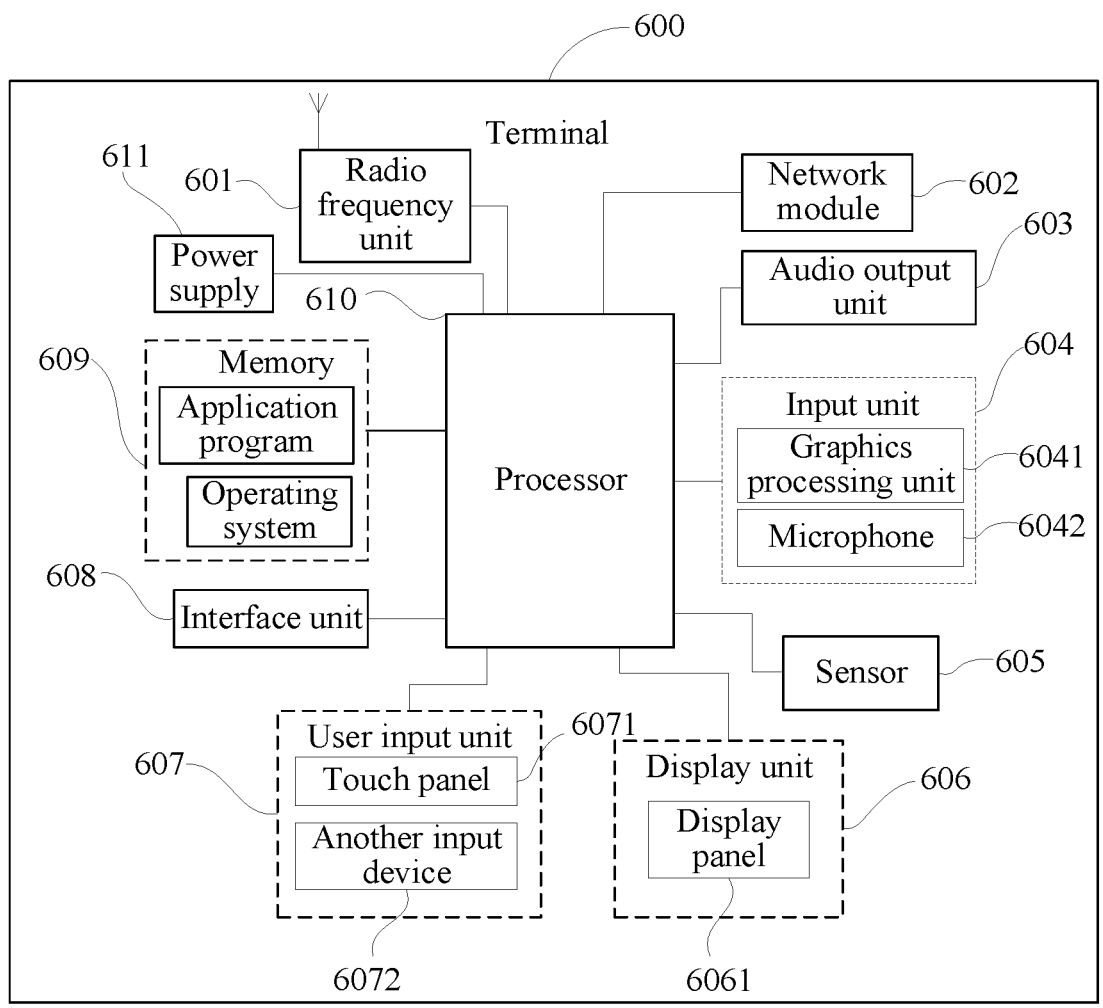
FIG. 6 is a second structural diagram of a terminal according to an embodiment of the present disclosure.

FIG. 6 is a second structural diagram of a terminal according to an embodiment of the present disclosure, and the terminal may be a schematic diagram of a hardware structure of a terminal for implementing various embodiments of the present disclosure. As shown in FIG. 6, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components.

A person skilled in the art may understand that the terminal structure shown in FIG. 6 does not constitute a limitation on the terminal, and the terminal may include more or fewer components than shown, or combine some components, or have different component arrangements. In the embodiments of the present disclosure, the terminal includes, but is not limited to, a mobile phone, a tablet computer, a notebook computer, a handheld computer, an in-vehicle terminal, a wearable device, a pedometer, and the like.

The processor 610 is configured to: perform a measurement operation on a first transmission node in Q transmission nodes in a case that a serving frequency of the terminal includes P transmission nodes, to obtain a first measurement result, where the Q transmission nodes are Q transmission nodes that allow measurement in the P transmission nodes; and the radio frequency unit 601 is configured to send a measurement report to a network-side device according to the first measurement result in a case that a measurement report triggering condition is met, where P is an integer greater than 1, and Q is a positive integer.

In some embodiments, the first transmission node in the Q transmission nodes is any one of the following:

all transmission nodes in the Q transmission nodes;

a serving transmission node of the terminal in the Q transmission nodes; or a specified transmission node in the Q transmission nodes.

In some embodiments, the first measurement result includes at least one of the following:

measurement results of all transmission nodes on which the measurement operation has been performed; or a measurement result of the serving frequency.

In some embodiments, the measurement report includes at least one of the following:

a measurement result of a second transmission node on which the measurement operation has been performed; or a measurement result of the serving frequency.

In some embodiments, the second transmission node is any one of the following:

all transmission nodes on which the measurement operation has been performed;

a specified transmission node in the transmission nodes on which the measurement operation has been performed;

a serving transmission node of the terminal in the transmission nodes on which the measurement operation has been performed; or K consecutive transmission nodes in the transmission nodes on which the measurement operation has been performed in a case that the transmission nodes are sorted according to the measurement result, where K is a positive integer.

In some embodiments, the measurement result of the serving frequency is obtained by the terminal through calculation according to a measurement result of a third transmission node on which the measurement operation has been performed.

In some embodiments, the third transmission node is any one of the following:

all transmission nodes on which the measurement operation has been performed;

a transmission node on which the measurement operation has been performed and that corresponds to a measurement result greater than or equal to a threshold value; or N consecutive transmission nodes on which the measurement operation has been performed in a case that the transmission nodes are sorted according to the measurement result, where N is a positive integer.

In some embodiments, the radio frequency unit 601 is further configured to: receive configuration information sent by the network-side device, where the configuration information is used for performing measurement configuration on the Q transmission nodes.

In some embodiments, the configuration information includes at least one of the following of the Q transmission nodes:
- a physical identifier of the transmission nodes;
- a measurement subcarrier spacing corresponding to the transmission nodes;
- a type of a measurement reference signal corresponding to the transmission nodes;
- a resource position of the measurement reference signal corresponding to the transmission nodes;
- a measurement result correction parameter corresponding to the transmission nodes; or
- a measurement type corresponding to the transmission nodes.

In some embodiments, physical identifiers of the P transmission nodes are different.

In some embodiments, the physical identifier may include at least one of the following:
- a physical cell identifier;
- an identifier of a reference signal;
- a port number identifier corresponding to the reference signal; or
- a resource position identifier of a control channel.

It should be noted that, in this embodiment, the terminal 600 may implement the processes in method embodiments in the embodiments of the present disclosure, and achieve the same beneficial effects. To avoid repetition, details are not described herein again.

It should be understood that, in this embodiment of the present disclosure, the radio frequency unit 601 may be configured to receive and send signals during an information receiving and sending process or a call process. In some embodiments, the radio frequency unit is configured to receive downlink data from a base station, and then send the downlink data to the processor 610 for processing; and in addition, send uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may further communicate with the network and another device through wireless communication system.

The terminal provides, by using the network module 602, wireless broadband Internet access for a user, for example, help the user to receive or send an email, browse a webpage, and access stream media.

The audio output unit 603 may convert audio data received by the radio frequency unit 601 or the network module 602 or stored in the memory 609 into an audio signal and output the audio signal as sound. In addition, the audio output unit 603 may further provide audio output related to specific functions implemented by the terminal 600 (for example, a call signal receiving sound and a message receiving sound). The audio output unit 603 includes a speaker, a buzzer, a receiver, and the like.

An input unit 604 is configured to receive an audio signal or a video signal. The input unit 604 may include a Graphics Processing Unit (GPU) 6041 and a microphone 6042. The graphics processing unit 6041 performs processing on image data of a static picture or a video that is obtained by an image acquisition device (for example, a camera) in a video acquisition mode or an image acquisition mode. An image frame that has been processed may be displayed on the display unit 606. An image frame that has been processed by the graphics processing unit 6041 may be stored in the memory 609 (or another storage medium) or sent by using the radio frequency unit 601 or the network module 602. The microphone 6042 may receive a sound, and can process the sound into audio data. The processed audio data may be converted, in a phone talk mode, into a format that may be sent to a mobile communication base station via the radio frequency unit 601 for output.

The terminal 600 further includes at least one sensor 605 such as an optical sensor, a motion sensor, or another sensor. In some embodiments, the optical sensor includes an ambient light sensor and a proximity sensor. The ambient light sensor may adjust luminance of the display panel 6061 according to brightness of the ambient light. The proximity sensor may switch off the display panel 6061 and/or backlight when the terminal 600 is moved to the ear. As one type of motion sensor, an accelerometer sensor can detect magnitudes of accelerations in various directions (generally, on three axes), may detect a magnitude and a direction of the gravity when static, and may be applied to recognizing the attitude of the terminal (for example, switching between landscape orientation and portrait orientation, a related game, and magnetometer attitude calibration), a function related to vibration recognition (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, etc., which are not be repeated herein.

The display unit 606 is configured to display information input by the user or information provided for the user. The display unit 606 may include a display panel 6061. The display panel 6061 may be configured by using a liquid crystal display (LCD), an organic light-emitting diode (OLED), or the like.

The user input unit 607 may be configured to receive input digit or character information, and generate a keyboard signal input related to the user setting and function control of the terminal. In some embodiments, the user input unit 607 includes a touch panel 6071 and another input device 6072. The touch panel 6071, also referred to as a touchscreen, may collect a touch operation of a user on or near the touch panel (such as an operation of a user on or near the touch panel 6071 by using any suitable object or attachment, such as a finger or a touch pen). The touch panel 6071 may include a touch detection apparatus and a touch controller. The touch detection apparatus detects a touch orientation of the user, detects a signal brought by the touch operation, and transmits the signal to the touch controller. The touch controller receives the touch information from the touch detection apparatus, converts the touch information into touch point coordinates, and transmits the touch point coordinates to the processor 610. Moreover, the touch controller may receive and execute a command transmitted from the processor 610. In addition, the touch panel 6071 may be implemented by using various types, such as a resistive type, a capacitive type, an infrared type, and a surface acoustic wave type. In addition to the touch panel 6071, the user input unit 607 may further include the another input device 6072. In some embodiments, the another input device 6072 may include, but not limited to, a physical keyboard, a functional key (such as a volume control key or a switch key), a track ball, a mouse, and a joystick, which are not described herein in detail.

Further, the touch panel 6071 may cover the display panel 6061. After detecting a touch operation on or near the touch panel 6071, the touch panel 1071 transmits the touch operation to the processor 610, to determine a type of a touch event. Then, the processor 610 provides a corresponding visual output on the display panel 6061 according to the type of the touch event. In FIG. 6, the touch panel 6071 and the display panel 6061 implement, as two independent parts, input and output functions of the terminal. However, in some embodiments, the touch panel 6071 and the display panel 6061 may be integrated to implement the input and output functions of the terminal. The details are not limited herein.

The interface unit 608 is an interface for connecting an external apparatus and the terminal 600. For example, the external apparatus may include a wired or wireless headset port, an external power supply (or a battery charger) port, a wired or wireless data port, a storage card port, a port used to connect an apparatus having an identification module, an audio input/output (Input/Output, I/O) port, a video I/O port, an earphone port, and the like. The interface unit 608 may be configured to receive input (for example, data information or power) from an external apparatus and transmit the received input to one or more elements in the terminal 600 or may be configured to transmit data between the terminal 600 and the external apparatus.

The memory 609 may be configured to store a software program and various data. The memory 609 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 609 may include a high speed random access memory, and may further include a non-volatile memory, such as at least one magnetic disk storage device, a flash memory or another volatile solid-state storage device.

The processor 610 is a control center of the terminal, and connects to various parts of the terminal by using various interfaces and lines. By miming or executing the software program and/or module stored in the memory 609, and invoking data stored in the memory 609, the processor performs various functions and data processing of the terminal, thereby performing overall monitoring on the terminal. The processor 610 may include one or more processing units. In some embodiments, the processor 610 may integrate an application processor and a modem processor. The application processor mainly processes an operating system, a user interface, an application program, and the like. The modem processor mainly processes wireless communication. It may be understood that the foregoing modem processor may not be integrated into the processor 610.

The terminal 600 may further include the power supply 611 (such as a battery) for supplying power to the components. In some embodiments, the power supply 611 may be logically connected to the processor 610 by using a power management system, thereby implementing functions such as charging, discharging, and power consumption management by using the power management system.

In addition, the terminal 600 includes some functional module that are not shown, which are not described herein in detail.

The embodiments of the present disclosure further provide a terminal, including a processor 610, a memory 609, and a computer program stored on the memory 609 and executable by the processor 610, where the computer program, when executed by the processor 610, implements the processes of the embodiments of the measurement method performed by a terminal, and can achieve the same technical effects. To avoid repetition, details are not described herein again.

Figure 7:
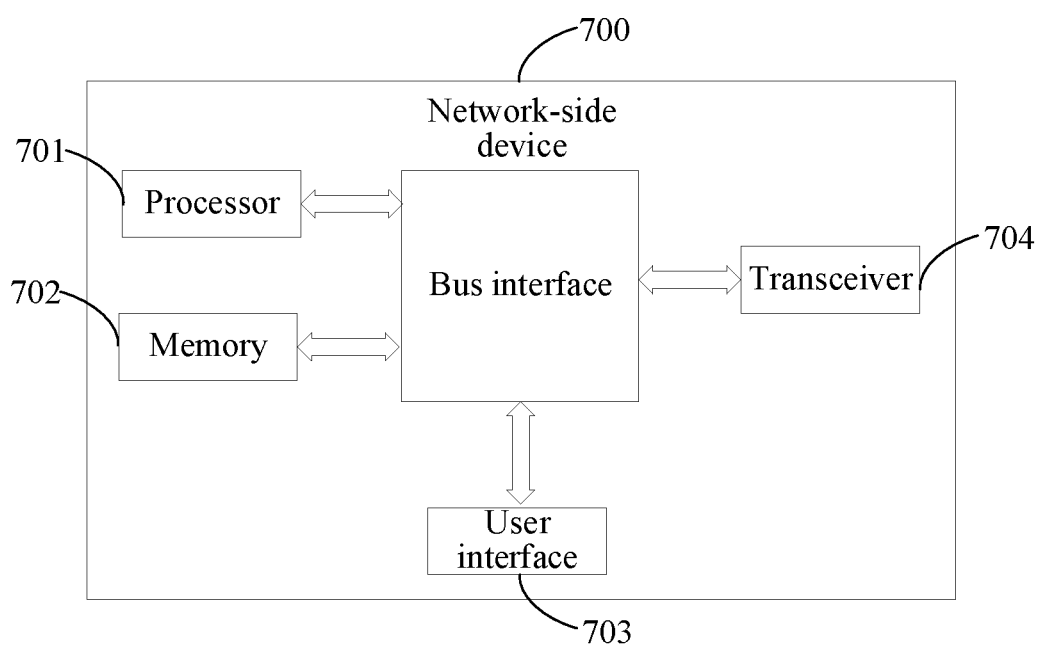
FIG. 7 is a second structural diagram of a network-side device according to an embodiment of the present disclosure.

FIG. 7 is a second structural diagram of a network-side device according to an embodiment of the present disclosure. As shown in FIG. 7, the network-side device 700 includes: a processor 701, a memory 702, a user interface 703, a transceiver 704, and a bus interface.

In this embodiment of the present disclosure, the network-side device 700 further includes: a computer program stored on the memory 702 and executable by the processor 701, where the computer program, when executed by the processor 701, implements the following step:

Receive a measurement report sent by a terminal, where the measurement report is obtained by the terminal according to a first measurement result, and the first measurement result is obtained by the terminal by performing a measurement operation on a first transmission node in Q transmission nodes, where a serving frequency of the terminal includes P transmission nodes; the Q transmission nodes are Q transmission nodes that allow measurement in the P transmission nodes; and P is an integer greater than 1, and Q is a positive integer.

In some embodiments, the computer program, when executed by the processor 701, may further implement the following steps:

Send first indication information to the terminal through the transceiver 704, where the first indication information is used for indicating the first transmission node.

In some embodiments, the first transmission node in the Q transmission nodes is any one of the following:
all transmission nodes in the Q transmission nodes;
a serving transmission node of the terminal in the Q transmission nodes; or
a specified transmission node in the Q transmission nodes.

In some embodiments, the first measurement result includes at least one of the following:
measurement results of all transmission nodes on which the measurement operation has been performed; or
a measurement result of the serving frequency.

In some embodiments, the measurement report includes at least one of the following:
a measurement result of a second transmission node on which the measurement operation has been performed; or
a measurement result of the serving frequency.

In some embodiments, the computer program, when executed by the processor 701, may further implement the following steps:

Send second indication information to the terminal through the transceiver 704, where the second indication information is used for indicating the second transmission node.

In some embodiments, the second transmission node is any one of the following:
all transmission nodes on which the measurement operation has been performed;
a specified transmission node in the transmission nodes on which the measurement operation has been performed;

a serving transmission node of the terminal in the transmission nodes on which the measurement operation has been performed; or K consecutive transmission nodes in the transmission nodes on which the measurement operation has been performed in a case that the transmission nodes are sorted according to the measurement result, where K is a positive integer.

In some embodiments, the measurement result of the serving frequency is obtained by the terminal through calculation according to a measurement result of a third transmission node on which the measurement operation has been performed.

In some embodiments, the computer program, when executed by the processor 701, may further implement the following steps:

Send third indication information to the terminal through the transceiver 704, where the third indication information is used for indicating the third transmission node.

In some embodiments, the third transmission node is any one of the following:
  all transmission nodes on which the measurement operation has been performed;
  a transmission node on which the measurement operation has been performed and that corresponds to a measurement result greater than or equal to a threshold value; or
  N consecutive transmission nodes on which the measurement operation has been performed in a case that the transmission nodes are sorted according to the measurement result, where N is a positive integer.

In some embodiments, the computer program, when executed by the processor 701, may further implement the following steps:

Send configuration information to the terminal through the transceiver 704, where the configuration information is used for performing measurement configuration on the Q transmission nodes.

In some embodiments, the configuration information includes at least one of the following of the Q transmission nodes:
  a physical identifier of the transmission nodes;
  a measurement subcarrier spacing corresponding to the transmission nodes;
  a type of a measurement reference signal corresponding to the transmission nodes;
  a resource position of the measurement reference signal corresponding to the transmission nodes;
  a measurement result correction parameter corresponding to the transmission nodes; or
  a measurement type corresponding to the transmission nodes.

In some embodiments, physical identifiers of the P transmission nodes are different.

In some embodiments, the physical identifier may include at least one of the following:
  a physical cell identifier;
  an identifier of a reference signal;
  a port number identifier corresponding to the reference signal; or
  a resource position identifier of a control channel.

In FIG. 7, a bus architecture may include any quantity of interconnected buses and bridges, and connects various circuits that are of one or more processors represented by the processor 701 and of a memory represented by the memory 702. The bus architecture may further connect various other circuits of a peripheral, a voltage regulator, a power management circuit, and the like. This is well known in the art, and therefore, no further description is provided in this specification. The bus interface provides an interface. The transceiver 704 may be a plurality of components, including a transmitter and a receiver, and providing units for communicating with various other apparatuses on a transmission medium. For different UEs, the user interface 703 may be an interface capable of externally or internally connecting a required device, the connected device includes, but not limited to, a keypad, a display, a speaker, a microphone, and a joystick.

The processor 701 is responsible for the management of the bus architecture and normal processing, and the memory 702 may store data used when the processor 2601 performs an operation.

In some embodiments, the computer program, when executed by the processor 701, may further implement the following steps:

The network-side device 700 can implement the processes implemented by the network-side device in the foregoing method embodiments. To avoid repetition, details are not described herein again.

The embodiments of the present disclosure further provide a computer-readable storage medium, storing a computer program, where the computer program, when executed by a processor, implements the processes of the embodiments of the measurement method performed by a terminal or a network-side device described above, and can achieve the same technical effects. To avoid repetition, details are not described herein again. The computer-readable storage medium is, for example, a Read-Only Memory (ROM), a Random Access Memory (RAM), a magnetic disk, or an optical disc.

It should be noted that, terms "include", "comprise", and any variants thereof in this specification are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses.

A person of ordinary skill in the art may be aware that the units and algorithm steps in the examples described with reference to the embodiments disclosed in this specification may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for convenience and conciseness of description, for specific work processes of the foregoing described system, apparatus, and unit, reference may be made to corresponding processes in the foregoing method embodiments, and details are not described herein again.

In the embodiments provided in this application, it should be understood that the disclosed apparatus and method may be implemented in other ways. For example, the described apparatus embodiment is merely an example. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to an actual requirement to achieve the objectives of the solutions in the embodiments.

In addition, functional units in the embodiments of the present disclosure may be integrated into one processing unit, or each of the units may exist alone physically, or two or more units may be integrated into one unit.

Through the descriptions of the foregoing implementations, a person skilled in the art may clearly understand that the methods in the foregoing embodiments may be implemented by software and a necessary general hardware platform, and may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

A person skilled in the art may understand that all or some of the procedures of the methods of the foregoing embodiments may be implemented by a computer program controlling relevant hardware. The program may be stored in a computer-readable storage medium. When the program is executed, the procedures of the foregoing method embodiments may be included. The storage medium may be a magnetic disc, an optical disc, a Read-Only Memory (ROM), or a Random Access Memory (RAM).

It may be understood that, the embodiments described in the embodiments of the present disclosure may be implemented by using software, hardware, firmware, middleware, microcode, or a combination thereof. For hardware implementation, a module, a unit, and a subunit may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general-purpose processor, a controller, a micro-controller, a microprocessor, and other electronic units configured to execute the functions in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented inside or outside the processor.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A measurement method, performed by a terminal, wherein the terminal is configured with P transmission nodes corresponding to a serving cell or a Bandwidth Part (BWP), the measurement method comprising:
    performing a measurement operation on a first transmission node in Q transmission nodes to obtain a first measurement result, wherein the Q transmission nodes are transmission nodes that allow measurement among the P transmission nodes, the Q transmission nodes include some or all of the P transmission nodes, and the Q transmission nodes are agreed in a protocol or configured by a network-side device; and
    sending a measurement report to the network-side device according to the first measurement result when a measurement report is triggered, wherein P is an integer greater than 1, and Q is a positive integer.

2. The measurement method according to claim 1, wherein the first transmission node in the Q transmission nodes is any one of the following:
    all transmission nodes in the Q transmission nodes;
    a serving transmission node of the terminal in the Q transmission nodes; or
    a specified transmission node in the Q transmission nodes.

3. The measurement method according to claim 1, wherein the first measurement result comprises at least one of the following:
    measurement results of all transmission nodes on which the measurement operation has been performed; or
    a measurement result of the serving cell or the BWP.

4. The measurement method according to claim 1, wherein the measurement report comprises at least one of the following:
    a measurement result of a second transmission node on which the measurement operation has been performed; or
    a measurement result of the serving cell or the BWP.

5. The measurement method according to claim 4, wherein the second transmission node is any one of the following:
    all transmission nodes on which the measurement operation has been performed;
    a specified transmission node in the transmission nodes on which the measurement operation has been performed;
    a serving transmission node of the terminal in the transmission nodes on which the measurement operation has been performed; or
    K consecutive transmission nodes in the transmission nodes on which the measurement operation has been performed, wherein the transmission nodes are sorted according to the measurement result, and K is a positive integer.

6. The measurement method according to claim 3, wherein the measurement result of the serving cell or the BWP is obtained by the terminal through calculation according to a measurement result of a third transmission node on which the measurement operation has been performed.

7. The measurement method according to claim 6, wherein the third transmission node is any one of the following:
  all transmission nodes on which the measurement operation has been performed;
  a transmission node on which the measurement operation has been performed and that corresponds to a measurement result greater than or equal to a threshold value; or
  N consecutive transmission nodes on which the measurement operation has been performed, wherein the transmission nodes are sorted according to the measurement result, and N is a positive integer.

8. The measurement method according to claim 1, wherein before the performing the measurement operation on the first transmission node in the Q transmission nodes, the method further comprises:
  receiving configuration information sent by the network-side device, wherein the configuration information is used for performing measurement configuration on the Q transmission nodes.

9. The measurement method according to claim 8, wherein the configuration information comprises at least one of the following of the Q transmission nodes:
  a physical identifier of the transmission nodes;
  a measurement subcarrier spacing corresponding to the transmission nodes;
  a type of a measurement reference signal corresponding to the transmission nodes;
  a resource position of the measurement reference signal corresponding to the transmission nodes;
  a measurement result correction parameter corresponding to the transmission nodes; or
  a measurement type corresponding to the transmission nodes.

10. The measurement method according to claim 1, wherein physical identifiers of the P transmission nodes are different.

11. The measurement method according to claim 9, wherein the physical identifier comprises at least one of the following:
  a physical cell identifier;
  an identifier of a reference signal;
  a port number identifier corresponding to the reference signal; or
  a resource position identifier of a control channel.

12. A terminal, configured with P transmission nodes corresponding to a serving cell or a Bandwidth Part (BWP), the terminal comprising:
  a memory storing a computer program; and
  a processor coupled to the memory and configured to execute the computer program to perform operations comprising:
    performing a measurement operation on a first transmission node in Q transmission nodes to obtain a first measurement result, wherein the Q transmission nodes are transmission nodes that allow measurement among the P transmission nodes, the Q transmission nodes include some or all of the P transmission nodes, and the Q transmission nodes are agreed in a protocol or configured by a network-side device; and
    sending a measurement report to the network-side device according to the first measurement result when a measurement report is triggered, wherein P is an integer greater than 1, and Q is a positive integer.

13. The terminal according to claim 12, wherein the first transmission node in the Q transmission nodes is any one of the following:
  all transmission nodes in the Q transmission nodes;
  a serving transmission node of the terminal in the Q transmission nodes; or
  a specified transmission node in the Q transmission nodes.

14. The terminal according to claim 12, wherein the first measurement result comprises at least one of the following:
  measurement results of all transmission nodes on which the measurement operation has been performed; or
  a measurement result of the serving cell or the BWP.

15. The terminal according to claim 12, wherein the measurement report comprises at least one of the following:
  a measurement result of a second transmission node on which the measurement operation has been performed; or
  a measurement result of the serving cell or the BWP.

16. The terminal according to claim 15, wherein the second transmission node is any one of the following;
  all transmission nodes on which the measurement operation has been performed;
  a specified transmission node in the transmission nodes on which the measurement operation has been performed;
  a serving transmission node of the terminal in the transmission nodes on which the measurement operation has been performed; or
  K consecutive transmission nodes in the transmission nodes on which the measurement operation has been performed, wherein the transmission nodes are sorted according to the measurement result, and K is a positive integer.

17. The terminal according to claim 14, wherein the measurement result of the serving cell or the BWP is obtained by the terminal through calculation according to a measurement result of a third transmission node on which the measurement operation has been performed.

18. The terminal according to claim 17, wherein the third transmission node is any one of the following:
  all transmission nodes on which the measurement operation has been performed;
  a transmission node on which the measurement operation has been performed and that corresponds to a measurement result greater than or equal to a threshold value; or
  N consecutive transmission nodes on which the measurement operation has been performed, wherein the transmission nodes are sorted according to the measurement result, and N is a positive integer.

19. The terminal according to claim 12, wherein before the performing the measurement operation on the first transmission node in the Q transmission nodes, the operations further comprise;
  receiving configuration information sent by the network-side device, wherein the configuration information is used for performing measurement configuration on the Q transmission nodes.

20. A non-transitory computer-readable storage medium, storing a computer program, wherein the computer program, when executed by a processor of a terminal, wherein the terminal is configured with P transmission nodes corresponding to a serving cell or a Bandwidth Part (BWP), causes the processor to perform operations comprising:
  performing a measurement operation on a first transmission node in Q transmission nodes to obtain a first measurement result, wherein the Q transmission nodes are transmission nodes that allow measurement among the P transmission nodes, the Q transmission nodes include some or all of the P transmission nodes, and the Q transmission odes are agreed in a protocol or configured by a network-side device; and sending a measurement report to the network-side device according to the first measurement result when a measurement report is triggered, wherein P is an integer greater than 1, and Q is a positive integer.

* * * * *